(12) United States Patent
Sakurada et al.

(10) Patent No.: US 11,140,530 B2
(45) Date of Patent: Oct. 5, 2021

(54) SERVER, ON-BOARD DEVICE, VEHICLE, NON-TRANSITORY STORAGE MEDIUM STORING PROGRAM, AND METHOD FOR PROVIDING INFORMATION

(71) Applicant: TOYOTA JIDOSHA KABUSHIKI KAISHA, Toyota (JP)

(72) Inventors: Shin Sakurada, Toyota (JP); Jun Okamoto, Nagoya (JP); Josuke Yamane, Nissin (JP); Risako Yamamoto, Toyota (JP); Kazuki Sugie, Toyota (JP); Masatoshi Komiyama, Handa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/723,157

(22) Filed: Dec. 20, 2019

(65) Prior Publication Data
US 2020/0221272 A1    Jul. 9, 2020

(30) Foreign Application Priority Data
Jan. 9, 2019    (JP) .............................. JP2019-002087

(51) Int. Cl.
*H04W 4/40*    (2018.01)
*G06K 9/00*    (2006.01)
(Continued)

(52) U.S. Cl.
CPC .......... *H04W 4/40* (2018.02); *G06K 9/00791* (2013.01); *G06K 9/4661* (2013.01); *H04W 4/021* (2013.01)

(58) Field of Classification Search
CPC ...... H04W 4/40; H04W 4/021; G06K 9/4661; G06K 9/00791; G06K 9/00778; G06K 9/00785; G06K 9/00798; G06K 9/00805; G06K 9/00812; G06K 9/00818; G06K 9/00825; G06K 9/00845; G06K 9/325; G06K 2209/15; G06K 2209/23; G06T 2207/30236; G06T 2207/30248;
(Continued)

(56) References Cited

U.S. PATENT DOCUMENTS 10,679,072 B2 *   6/2020  Fujita ....................... G06K 9/46
10,733,879 B2 *   8/2020  Masuike ................. B60R 21/00
(Continued)

FOREIGN PATENT DOCUMENTS

JP    2018-074440 A     5/2018
KR    10-2015-0011654 A  2/2015

*Primary Examiner* — Nathnael Aynalem
(74) *Attorney, Agent, or Firm* — Oblon, McClelland, Maier & Neustadt, L.L.P.

(57) ABSTRACT

A server, an on-board device, a vehicle, a non-transitory storage medium storing a program, and a method for providing information are provided. The server includes circuitry configured to: receive information on an image capture date and time and an image capture location from an on-board device that is configured to capture an image of surroundings of a vehicle and produces the captured image, the surroundings including a sidewalk; store brightness information of the sidewalk on the image capture date and time, the brightness information being detected based on the captured image and the image capture location; and send the brightness information to a mobile terminal.

13 Claims, 9 Drawing Sheets

(51) Int. Cl.
*G06K 9/46* (2006.01)
*H04W 4/021* (2018.01)

(58) Field of Classification Search
CPC . G06T 2207/30252; G06T 2207/30256; G06T 2207/30261; G06T 2207/30264; G06T 2207/30268; G08G 1/16; G08G 1/116; G08G 1/167; G08G 1/168; G08G 1/20; B60W 50/14; B60W 2050/143; B60W 2550/10; B60W 2550/14; B60R 2001/1215; B60R 1/00; B60R 2025/1013; B60R 2025/1016; B60R 2300/105; B60R 2300/106; B60R 2300/806; B60R 2300/8066; B60R 2300/8073; B60R 2300/8086; B60R 2300/8093; G01S 17/93; G01S 17/931; B62D 15/029
USPC .......................................................... 348/148
See application file for complete search history.

(56) References Cited

U.S. PATENT DOCUMENTS

| | | | |
|---|---|---|---|
| 2016/0364197 A1* | 12/2016 | Cho | G06Q 20/102 |
| 2018/0225524 A1 | 8/2018 | Fujita | |
| 2020/0347581 A1* | 11/2020 | Shimamura | E02F 9/262 |

* cited by examiner

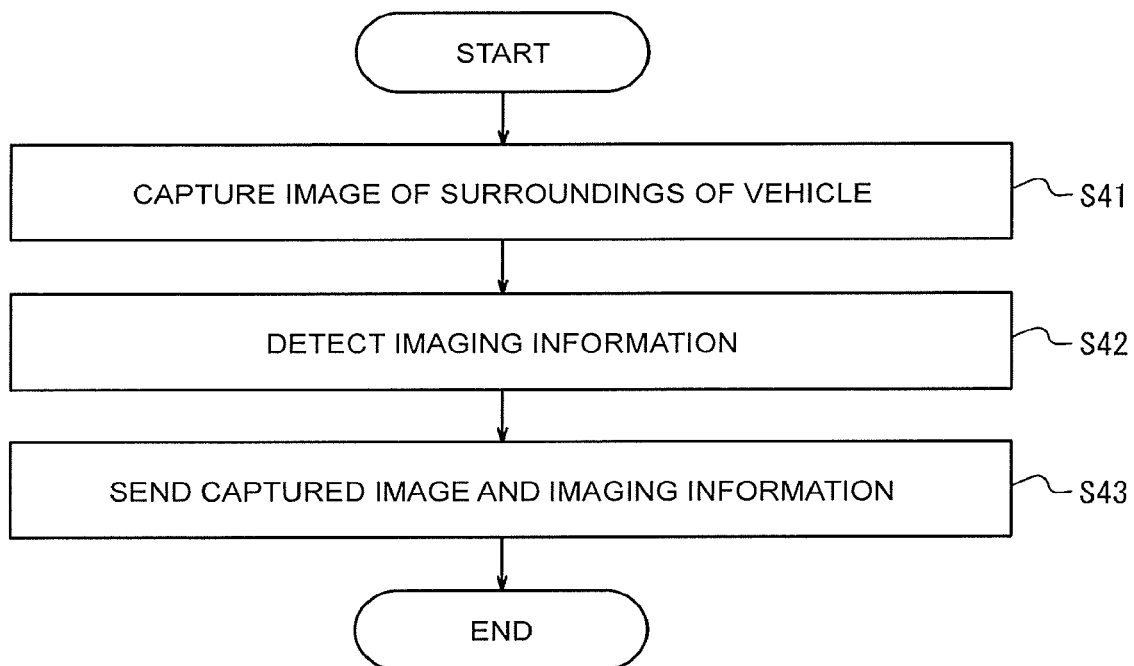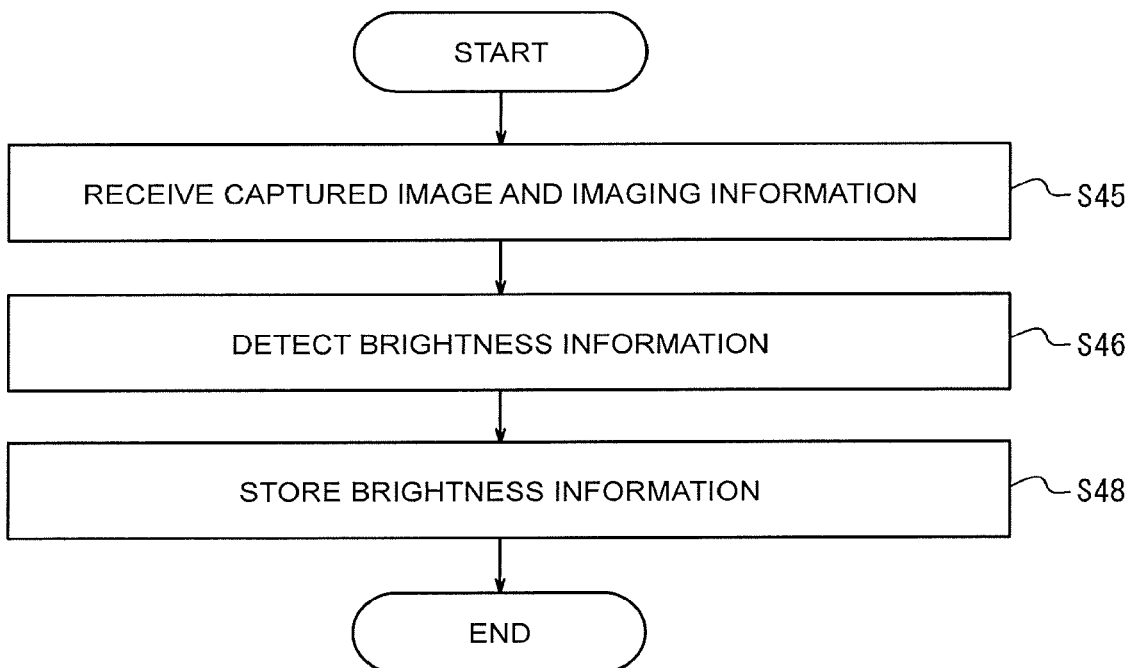

SERVER, ON-BOARD DEVICE, VEHICLE, NON-TRANSITORY STORAGE MEDIUM STORING PROGRAM, AND METHOD FOR PROVIDING INFORMATION

INCORPORATION BY REFERENCE

The disclosure of Japanese Patent Application No. 2019-002087 filed on Jan. 9, 2019 including the specification, drawings and abstract is incorporated herein by reference in its entirety.

BACKGROUND

1. Technical Field

The present disclosure relates to a server, an on-board device, a vehicle, a non-transitory storage media storing a program, and a method for providing information.

2. Description of Related Art

A technique is known in which an image of surroundings of a vehicle is captured and produced by an on-board camera to display the captured image in a vehicle cabin or to provide the captured image for various kinds of image processing. Brightness in the environment outside a vehicle changes due to factors such as whether it is daytime or nighttime and the weather. Accordingly, a technique is proposed in which an image suitable for the purpose of use is captured regardless of the brightness in the environment outside a vehicle. For example, Japanese Patent Application Publication No. 2018-074440 (JP 2018-074440 A) discloses a technique in which brightness around an on-board camera is detected by an illuminance sensor and an imaging mode such as aperture and exposure time of an on-board camera is adjusted depending on the brightness.

SUMMARY

In the technique of JP 2018-074440 A, the overall brightness of a captured image is adjusted by switching the imaging mode. However, user convenience would be improved by providing useful information to a user based on partial brightness of a captured image.

The disclosure provides a server etc. that improves user convenience.

A first aspect of the disclosure relates to a server. The server includes circuitry configured to: receive information on an image capture date and time and an image capture location from an on-board device that is configured to capture an image of surroundings of a vehicle and produces the captured image, the surroundings including a sidewalk; store brightness information of the sidewalk on the image capture date and time, the brightness information being detected based on the captured image and the image capture location; and send the brightness information to a mobile terminal.

A second aspect of the disclosure relates to an on-board device. The on-board device includes: an imaging unit configured to capture an image of surroundings of a vehicle and produce the captured image, the surroundings including a sidewalk; and one or more processors configured to obtain an image capture date and time and an image capture location when the imaging unit captures the image, detect brightness information of the sidewalk on the image capture date and time based on the captured image and the image capture location; and a transmitter configured to send the brightness information to a server.

A third aspect of the disclosure relates to a vehicle including the on-board device of the second aspect.

A fourth aspect of the disclosure relates to a non-transitory storage medium storing a program. The program is executable by a mobile terminal and configured to cause the mobile terminal to perform a process, the process including: receiving brightness information of a road on an image capture date and time from a server storing the brightness information, the brightness information being detected based on a captured image and an image capture location, and the captured image being an image of surroundings of a vehicle, which is captured and produced by an on-board device, the surroundings including a sidewalk; and outputting the brightness information.

A fifth aspect of the disclosure relates to a method for providing information by an on-board device and a server. The method includes: capturing an image of surroundings of a vehicle and producing the captured image by the on-board device, the surroundings including a sidewalk; detecting brightness information of the sidewalk on an image capture date and time based on the captured image and an image capture location by at least one of the on-board device and the server; and sending the brightness information from the server to a mobile terminal.

The server, the on-board device, the vehicle, the non-transitory storage media storing a program, and the method for providing information according to the present disclosure can improve user convenience.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4A is a flowchart illustrating operation of the on-board device;

FIG. 4B is a flowchart illustrating operation of the server;

DETAILED DESCRIPTION OF EMBODIMENTS

An embodiment of the invention will be described below with reference to the accompanying drawings.

Figure 1:
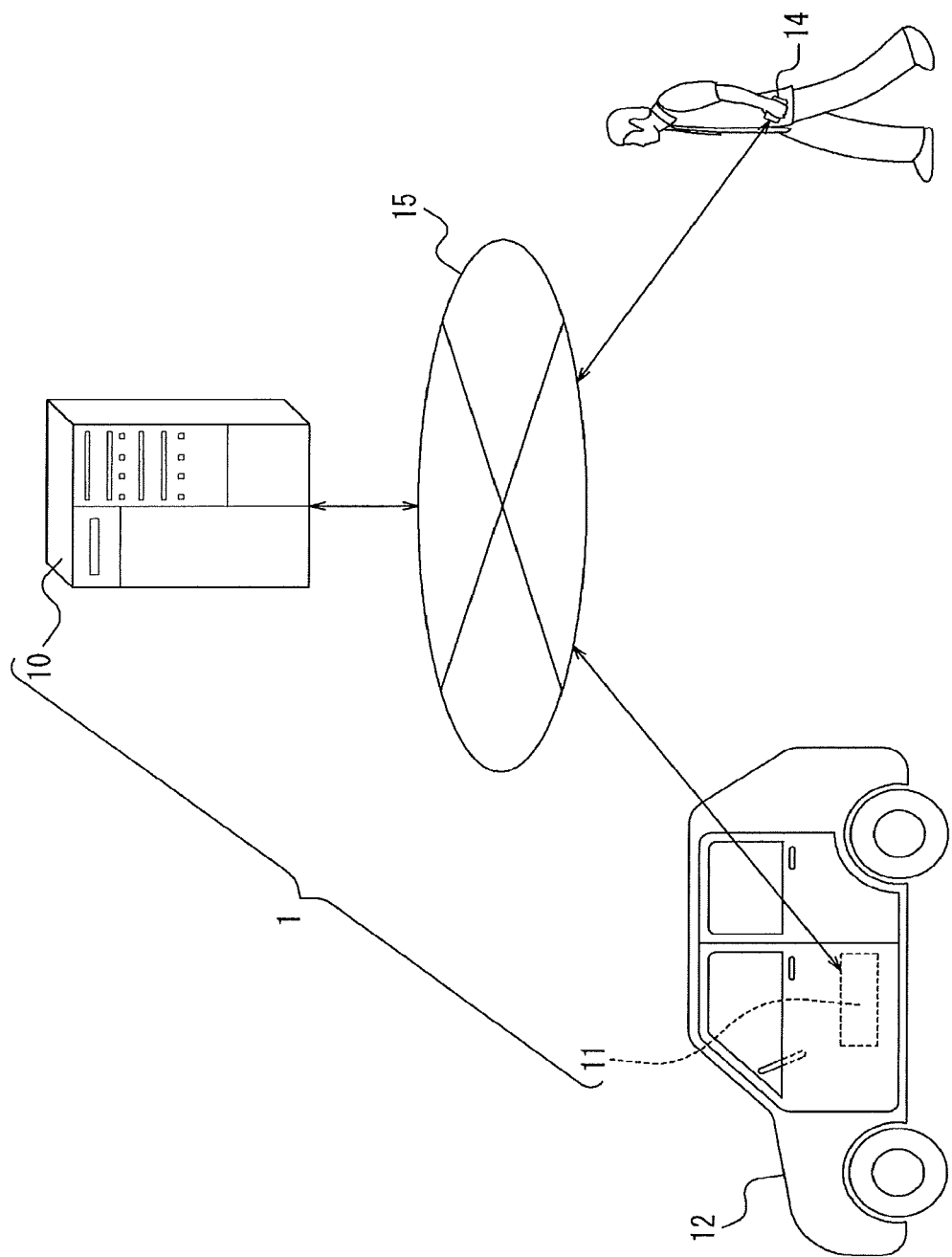
FIG. 1 is a diagram illustrating a configuration of an information providing system.

FIG. 1 illustrates a configuration of an information providing system 1 according to an embodiment. The information providing system 1 includes a server 10 and an on-board device 11 mounted on a vehicle 12. The server 10 and the on-board device 11 are connected wired or wireless via a network 15 so that the server 10 and the on-board device 11 can communicate with each other via the network 15. The server 10 may be connected to on-board devices 11 of a plurality of vehicles 12. The vehicle 12 is, e.g., an automobile. However, the vehicle 12 is not limited to an automobile and may be any vehicle a user can ride in. A mobile terminal 14 carried by the user is connected wired or wireless to the server 10 via the network 15 so that the mobile terminal 14 can communicate with the server 10 via the network 15.

The on-board device 11 captures an image of surroundings of the vehicle 12 including a sidewalk while the vehicle 12 is moving and produces the captured image. As used herein, the term "sidewalk" includes not only a footway separated from a roadway by a guardrail etc. but also a shoulder where pedestrians are allowed to walk. The on-board device 11 sends the captured image, the date and time the image was captured (hereinafter referred to as the image capture date and time), and the location where the image was captured (hereinafter referred to as the image capture location), or sends at least the image capture date and time and the image capture location, to the server 10. The server 10 stores brightness information of the sidewalk on the image capture date and time which is detected based on the captured image and the image capture location. The brightness information of the sidewalk contains at least one of information on the position of a part that is shaded in the daytime and information on the position of a part that is lit by a light source in the nighttime. As used herein, the term "daytime" means the time between sunrise and sunset, and the term "nighttime" means the time between sunset and sunrise. Shade is created when sunlight is blocked by buildings or street trees. Examples of the light source that lights the sidewalk include headlights of vehicles moving nearby, streetlights, and light coming from buildings. For example, in the case where the image was captured in the daytime, the server 10 stores information on the position of a part that is shaded in the daytime, which is detected based on the captured image and the image capture location, as brightness information of the sidewalk. For example, in the case where the image was captured in the nighttime, the server 10 may store information on the position of a part that is lit by a light source in the nighttime as brightness information of the sidewalk. The server 10 sends the brightness information to the mobile terminal 14. The user can thus obtain the brightness information of the sidewalk via the mobile terminal 14. Since the user knows the position of the shaded part of the sidewalk when the sun is strong, he or she can take a shadier path when walking on the sidewalk in the daytime. The user can also take a path with more lit parts when walking on the sidewalk in the nighttime, for example. The user can therefore walk more comfortably and more safely, and user convenience is improved.

Figure 2:
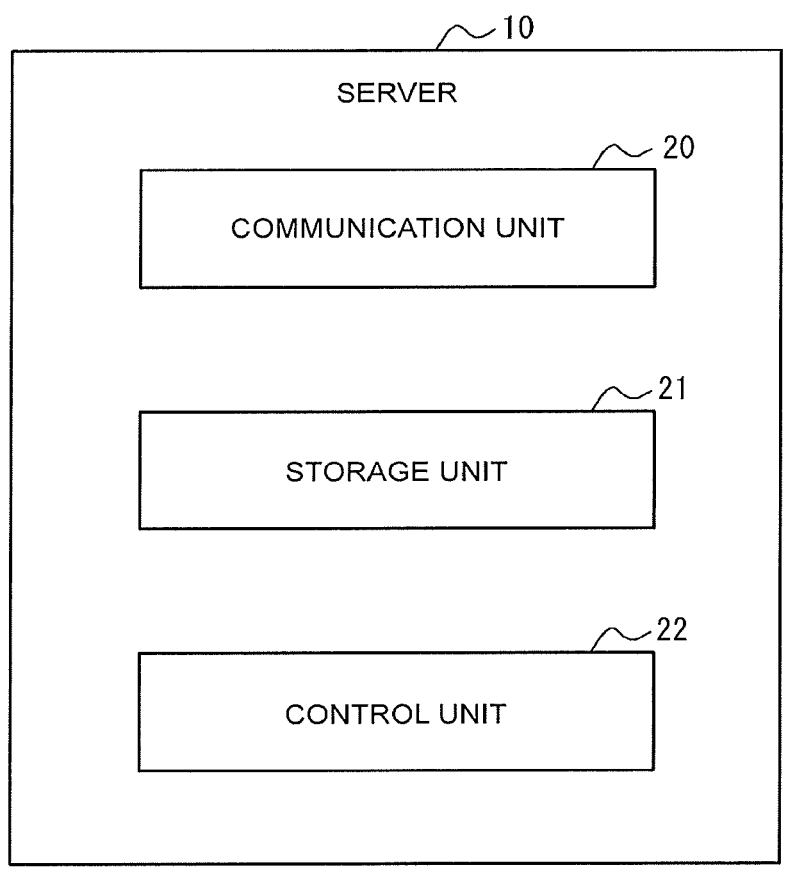
FIG. 2 is a diagram illustrating a configuration of a server.

FIG. 2 illustrates a configuration of the server 10. The server 10 includes a communication unit 20, a storage unit 21, and a control unit 22. The server 10 is a single computer or is comprised of a plurality of computers that can communicate with each other.

The communication unit 20 includes one or more communication modules connected to the network 15. For example, the communication unit 20 may include a communication module in accordance with wired local area network (LAN) standards. In the present embodiment, the server 10 is connected to the network 15 via the communication unit 20.

The storage unit 21 includes one or more memories. Each of the memories functions as, for example, a main storage device, an auxiliary memory device, or a cache memory. The storage unit 21 stores any desired information, control and processing programs, and database to be used for operation of the server 10.

The control unit 22 includes one or more processors. Each of the processors is, but not limited to, a general-purpose processor or a special-purpose processor for a specific processing operation. The control unit 22 controls operation of the server 10 according to the control and processing programs stored in the storage unit 21. The control unit 22 also has a timer function to get the current time.

Figure 3:
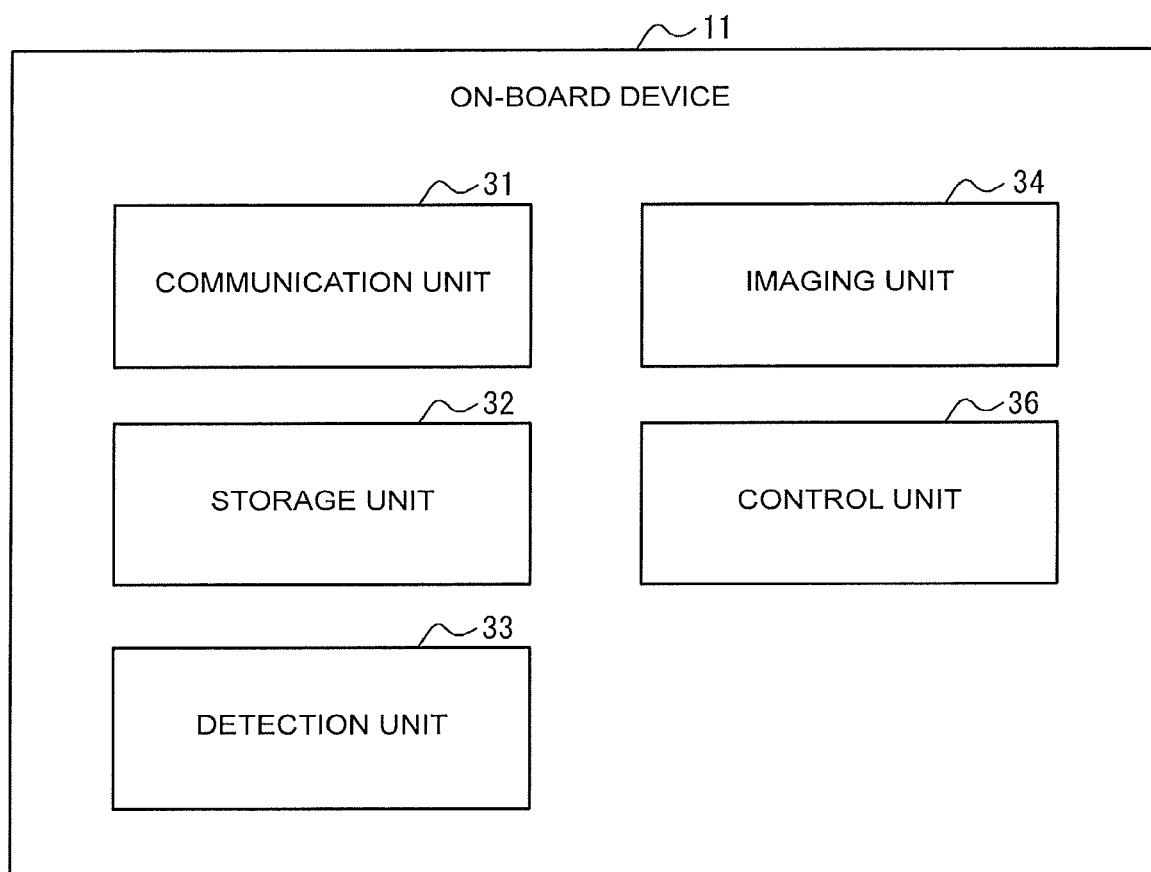
FIG. 3 is a diagram illustrating a configuration of an on-board device.

FIG. 3 illustrates a configuration of the on-board device 11. The on-board device 11 includes a communication unit 31, a storage unit 32, a detection unit 33, an imaging unit 34, and a control unit 36. The on-board device 11 may be a single device or may be comprised of a plurality of devices.

The communication unit 31 includes one or more communication modules. Examples of the communication module include modules in accordance with mobile communication standards such as 4th generation (4G) and 5th generation (5G). The communication unit 31 may include a communication device such as a data communication module (DCM). The on-board device 11 is connected to the network 15 via the communication unit 31 and performs data communication with the server 10. The communication module includes a global positioning system (GPS) receiving module. The on-board device 11 receives GPS signals via the communication unit 31.

The storage unit 32 includes one or more memories. Each of the memories is, but not limited to, a semiconductor memory, a magnetic memory, or an optical memory, for example. Each memory functions as, for example, a main storage device, an auxiliary storage device, or a cache memory. The storage unit 32 stores any desired information to be used for operation of the on-board device 11. For example, the storage unit 32 may store control and processing programs, embedded software, etc.

The detection unit 33 includes various sensors that detect the vehicle speed, the braking force of a brake of the vehicle, the acceleration, the steering angle, the yaw rate, the direction, etc. The detection unit 33 sends the detection results of the sensors to the control unit 36 at predetermined intervals.

The imaging unit 34 carries out the imaging function of the on-board device 11. The imaging unit 34 includes, for example, one or more cameras that capture an image of a view or object ahead of the vehicle 12 in the direction in which the vehicle 12 is moving. The imaging unit 34 may include a camera that captures an image of a view or object on the side of or behind the vehicle 12. The camera of the imaging unit 34 may be either a monocular camera or a stereo camera. The imaging unit 34 captures an image of a view or object around the vehicle, produces the captured image, and sends the captured image to the control unit 36.

The control unit 36 includes one or more processors. Each of the processors is, but not limited to, a general-purpose processor or a special-purpose processor for a specific processing operation. For example, an electronic control unit (ECU) mounted on the vehicle 12 may function as the control unit 36. The control unit 36 controls overall operation of the on-board device 11. The control unit 36 also has a timer function to get the current time.

Referring back to FIG. 1, the mobile terminal 14 is a portable electronic device, such as a smartphone or a tablet, which includes a communication module connected to the network 15, a storage unit and a control unit, and an input/output interface. The mobile terminal 14 carries out various functions by executing various application programs by the control unit. For example, the mobile terminal 14 receives GPS signals to detect its own location.

Next, operation of the information providing system 1 of the present embodiment will be described with reference to FIGS. 4A to 9B.

FIG. 4A is a flowchart illustrating operation of the on-board device 11. The on-board device 11 performs the process illustrated in FIG. 4A at any desired intervals (e.g., at intervals of several milliseconds to several seconds) while the vehicle 12 is moving. The process illustrated in FIG. 4A may be triggered by any event (e.g., detection of a braking operation or releasing of the brake, a certain vehicle speed, a certain steering operation, etc.) that occurs while the vehicle 12 is moving.

The on-board device 11 captures an image of surroundings of the vehicle 12 (step S41). For example, the control unit 36 sends a command to capture an image to the imaging unit 34, and the imaging unit 34 captures an image of the surroundings of the vehicle 12 in response to the command. An imaging region corresponds to the position where the camera is mounted. For example, the imaging region is a region ahead of, behind, or on the side of the vehicle 12. The on-board device 11 then detects imaging information (step S42). The imaging information contains the image capture location, the image capture time, the direction of the vehicle 12, and the imaging region. For example, the control unit 36 receives a GPS signal from the communication unit 31 and detects its own current location as an image capture location. The control unit 36 uses its internal timer function to get the current time as an image capture time. The control unit 36 obtains the direction of the vehicle 12 from the detection unit 33. The control unit 36 obtains the orientation of the camera in the vehicle 12 from the imaging unit 34. The order of steps S41 and S42 may be reversed. The on-board device 11 sends the captured image and the imaging information to the server 10 (step S43). For example, the control unit 36 obtains the captured image from the imaging unit 34 and sends the captured image and the imaging information to the server 10 via the communication unit 31.

FIG. 4B is a flowchart illustrating operation of the server 10. The server 10 performs the process illustrated in FIG. 4B when receiving a captured image from a single on-board device 11. First, the server 10 receives a captured image and imaging information from an on-board device 11 (step S45). For example, the control unit 22 receives a captured image and imaging information containing an image capture location, an image capture time, the direction of the vehicle 12, and an imaging region via the communication unit 20.

Next, the server 10 detects brightness information of a sidewalk from the captured image (step S46). The brightness information of the sidewalk is information on the position of a part that is shaded in the daytime and/or the position of a part that is lit by a light source in the nighttime.

The control unit 22 determines whether the image capture date and time including month, date, and time is daytime or nighttime. For example, the control unit 22 refers to sunrise and sunset times for each date stored in advance in the storage unit 21 or refers to sunrise and sunset times for each date obtained via the network 15 to determine whether the image capture date and time is daytime (anytime between sunrise and sunset) of the date or nighttime (anytime between sunset and sunrise) of the date.

Figure 5A:
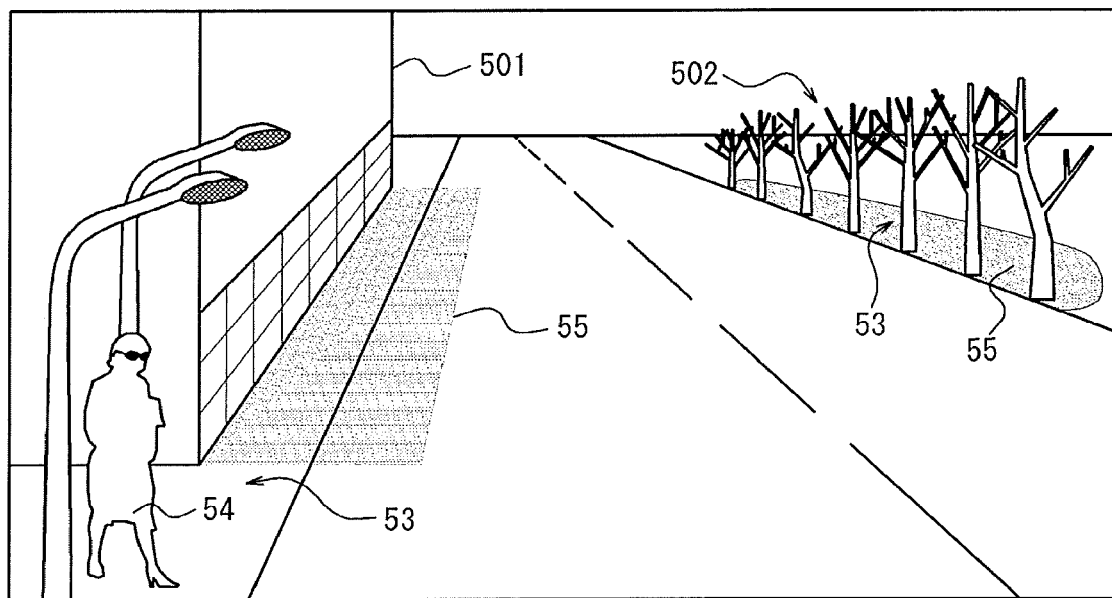
FIG. 5A is a diagram illustrating an example of detection of brightness information.
Figure 5B:
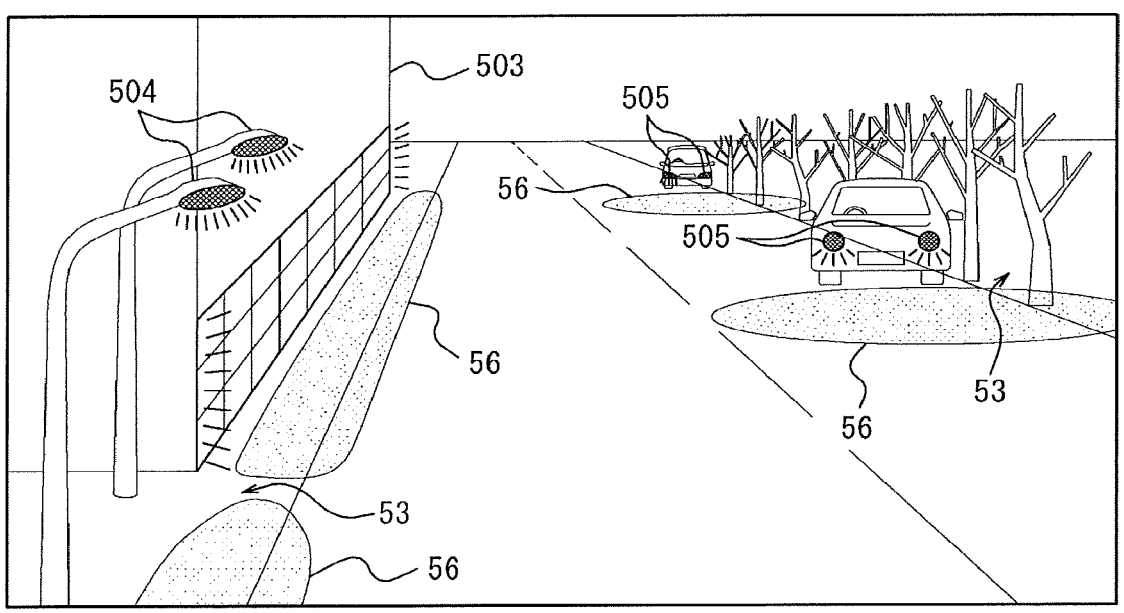
FIG. 5B is a diagram illustrating another example of detection of brightness information.

When determining that the image capture date and time is daytime of the date, the control unit 22 detects the shaded part from the captured image by image recognition. When determining that the image capture date and time is nighttime of the date, the control unit 22 detects the part lit by a light source from the captured image by image recognition. FIGS. 5A and 5B illustrate schematic examples of images captured ahead of the vehicle 12 in the daytime and the nighttime. For example, the control unit 22 detects sidewalks 53 from an image 51 captured in the daytime as shown in FIG. 5A, and further detects a building 501, street trees 502, etc. and parts 55 of the sidewalks 53 which are shaded by the building 501, the street trees 502, etc. The control unit 22 may detect the shaded parts 55 on the condition that the control unit 22 detects any passerby 54 wearing (here, "wearing" also include a meaning of carrying, holding or using) a tool that is likely to be worn or used when the sun is strong, such as sunglasses, a visor, or a UV umbrella. When the control unit 22 can detect any passerby 54 wearing such a tool, it is likely that the sun is strong, which increases the necessity to provide the position of any shaded part to the user. However, when the control unit 22 cannot detect any passerby 54 wearing such a tool, detection of shaded parts can be omitted, so that the load on the server 10 can be reduced. Alternatively, the control unit 22 detects sidewalks 53 from an image 52 captured in the nighttime as shown in FIG. 5B, and further detects light sources such as headlights 505 of vehicles moving nearby, streetlights 504, light coming from a building 503, etc. and parts 56 of the sidewalks 53 which are lit by the light sources. The image recognition process for the captured images includes edge recognition, pattern recognition based on color, shape, and brightness, etc. The image recognition process may be performed by using any method such as machine learning.

The control unit 22 derives the positions of the shaded parts 55 or the lit parts 56 on a map. The positions of the shaded parts 55 or the lit parts 56 on the map are calculated from the direction and distance from the vehicle 12 that captured the image and the image capture location. The direction from the vehicle 12 is calculated from, for example, the direction of the vehicle 12 detected by the detection unit 33 of the vehicle 12 and the orientation of the camera in the vehicle 12, which are contained in the imaging information. The distance from the vehicle 12 can be detected by a motion stereo method using successive images captured by a monocular camera, a stereo method using parallax of a stereo camera, and the like.

Figure 6:
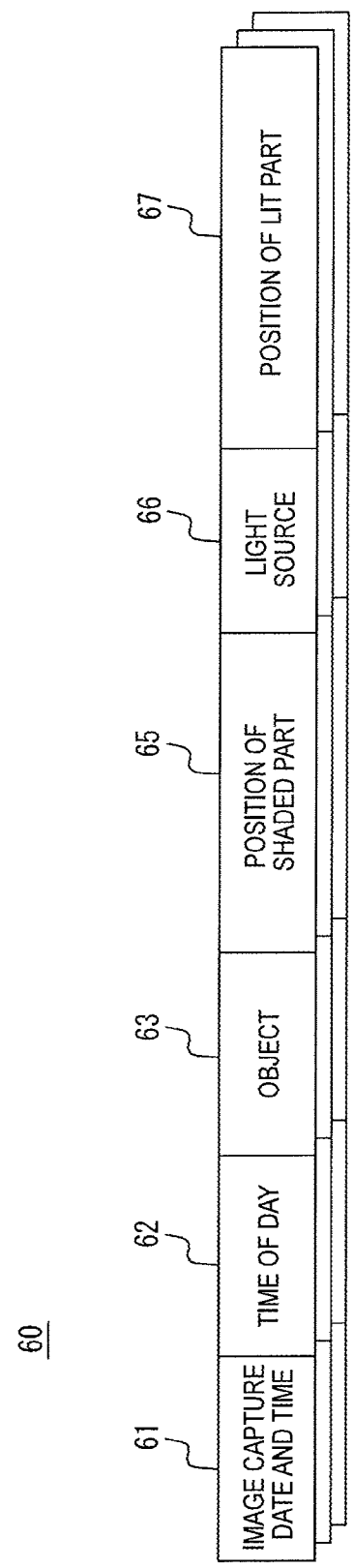
FIG. 6 is a diagram illustrating an example of brightness information.

The server 10 then stores the brightness information of the sidewalk (step S48). For example, the control unit 22 stores brightness information 60 as shown in FIG. 6 in the storage unit 21. As shown in FIG. 6, the brightness information 60 is stored regarding image capture date and time 61, time of day 62, an object 63 that creates shade in the daytime, a position 65 of a shaded part, a light source 66 in the nighttime, and a position 67 of a lit part. The time of day 62 is, for example, "daytime" or "nighttime." The object 63 that creates shade is a "building," a "street tree," etc. The light source 66 is a "headlight," a "streetlight," "light," etc. The position 65 of the shaded part and the position 67 of the lit part are the latitude and longitude that can be specified on a map. Depending on the capacity of the storage unit 21, images captured at different dates and times may be stored in the storage unit 21 for each image capture date and time.

Figure 7A:
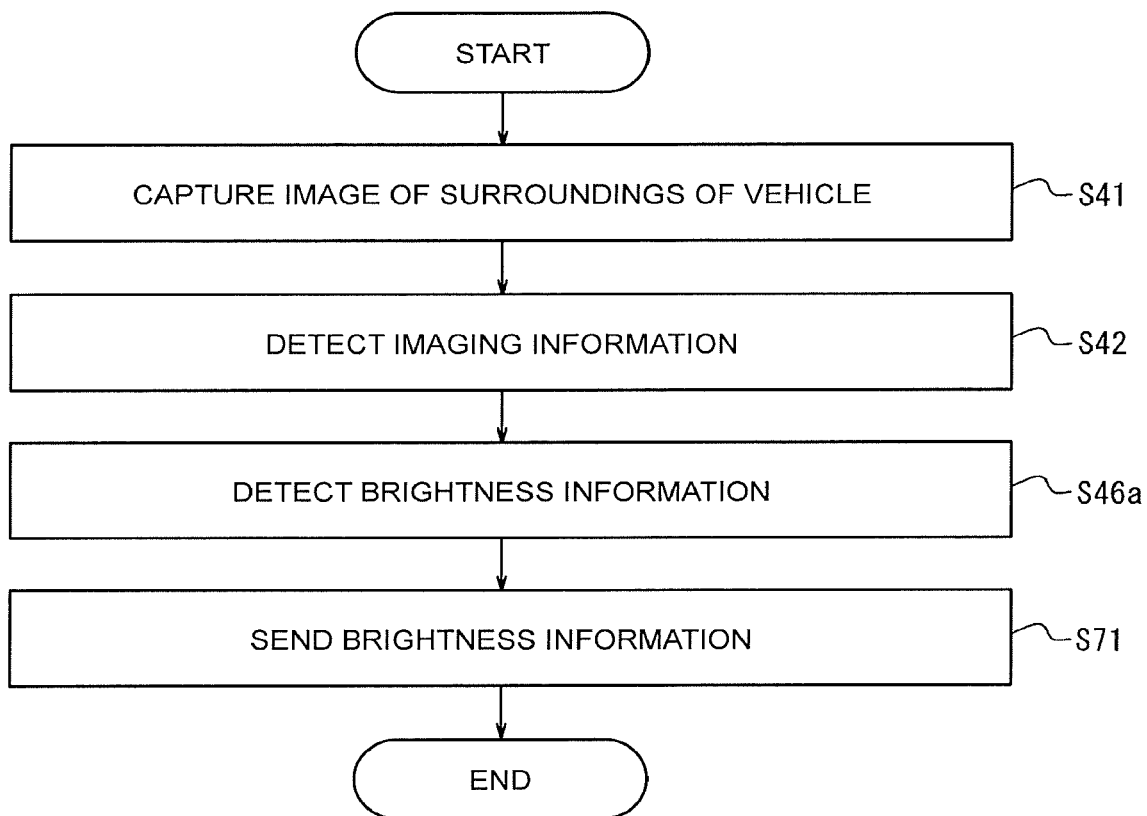
FIG. 7A is a flowchart illustrating operation of an on-board device of a modification.
Figure 7B:
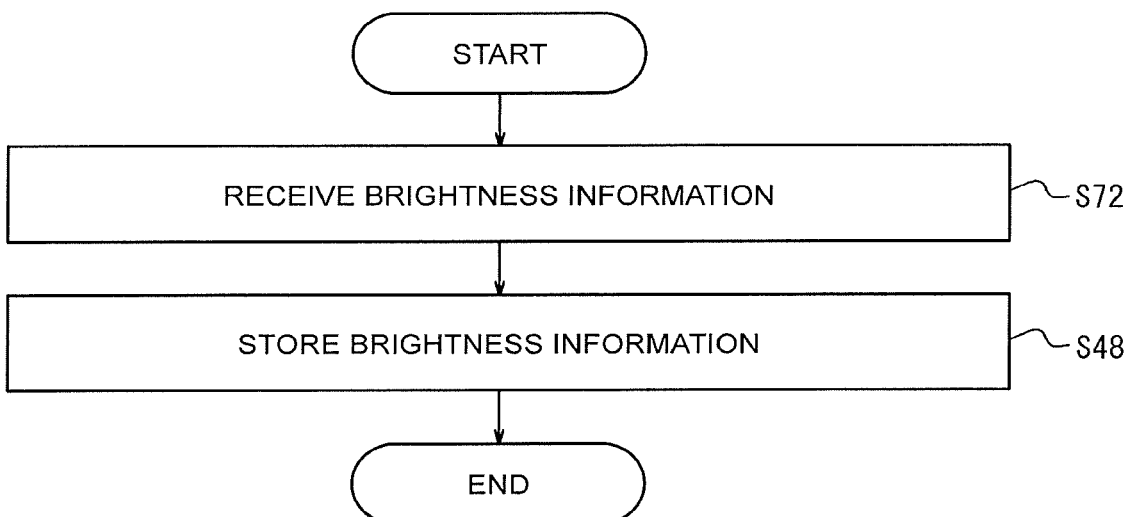
FIG. 7B is a flowchart illustrating operation of a server of the modification.

A modification of the processes of FIGS. 4A and 4B is illustrated in FIGS. 7A and 7B. FIGS. 7A and 7B are flowcharts illustrating operation of the on-board device 11 and operation of the server 10 in the modification. In FIGS. 7A and 7B, the same steps as those in FIGS. 4A and 4B are denoted with the same reference characters as those in FIGS. 4A and 4B. In this modification, after the on-board device 11 captures an image of surroundings of the vehicle 12 (step S41) and detects imaging information (step S42), the control unit 36 detects brightness information of a sidewalk (step S46a) and sends the detected brightness information to the server 10 (step S71). The server 10 receives brightness information from each on-board device 11 (step S72) and stores the brightness information (step S48). This modification can reduce the processing load on the server 10.

The control unit 22 of the server 10 which performs step S46 or the control unit 36 of the on-board device 11 which performs step S46a corresponds to the "brightness information detection unit."

Figure 8:
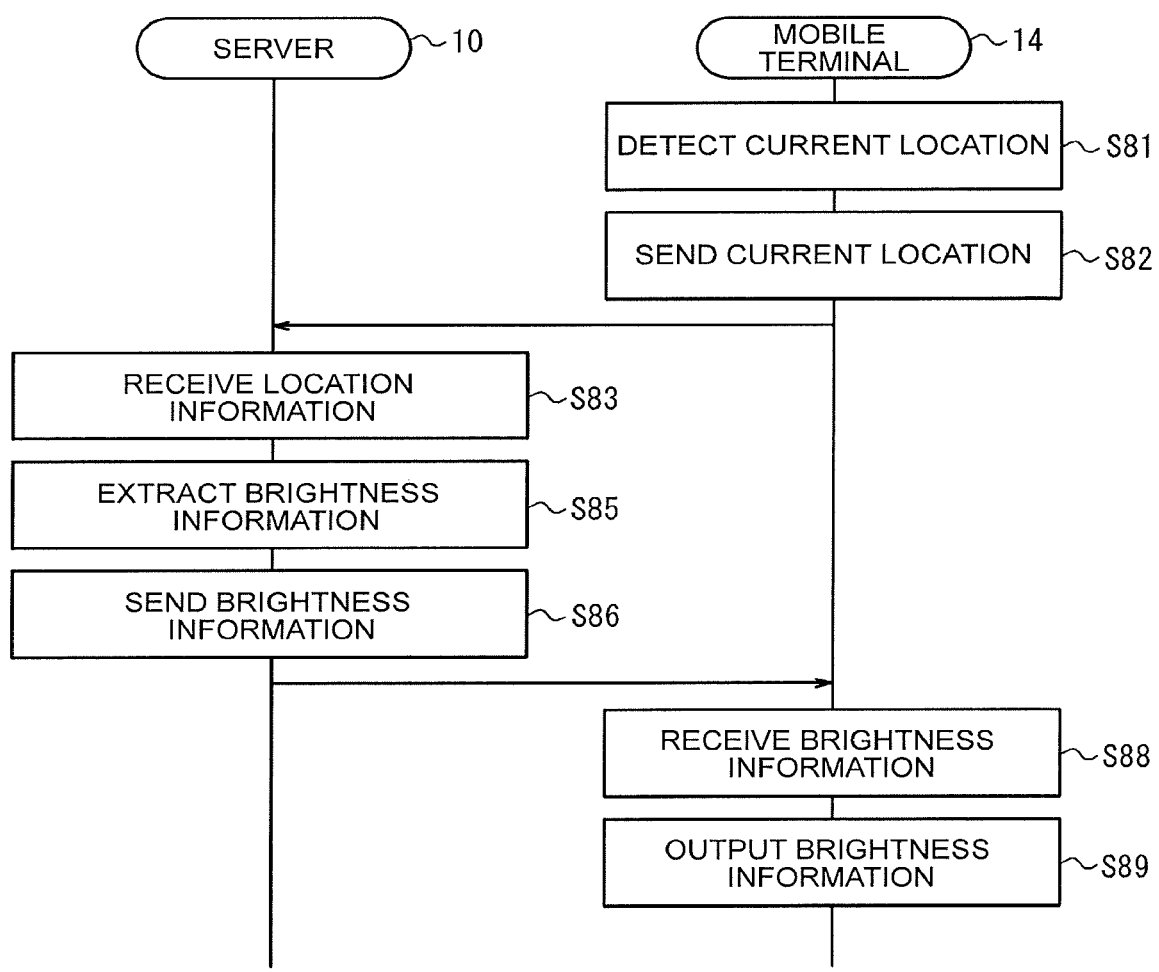
FIG. 8 is a sequence diagram illustrating operation of the information providing system.

FIG. 8 is a sequence diagram illustrating operation of the server 10 and the mobile terminal 14. The process illustrated in FIG. 8 is performed when the user activates with the mobile terminal 14 an application program for detecting brightness information, for example.

First, the mobile terminal 14 detects its current location (step S81) and sends the current location to the server 10 (step S82).

Next, the server 10 receives the current location of the mobile terminal 14 (step S83), extracts brightness information containing the time of day corresponding to the time the server 10 received the current location of the mobile terminal 14 and the position of a shaded part and/or a lit part corresponding to the current location of the mobile terminal 14 (step S85), and sends the extracted brightness information to the mobile terminal 14 (step S86). For example, the control unit 22 receives the current location via the communication unit 20. The control unit 22 extracts from the brightness information 60 stored in the storage unit 21 the brightness information 60 containing the time of day 62 corresponding to the current time and the position 65 of the shaded part or the position 67 of the lit part corresponding to the current location of the mobile terminal 14 according to the time of day. The position corresponding to the current location of the mobile terminal 14 includes positions within any desired distance range (e.g., several tens to several hundreds of meters) from the current location of the mobile terminal 14, for example. The control unit 22 sends the extracted brightness information 60 from the communication unit 20 to the mobile terminal 14.

The mobile terminal 14 then receives the brightness information (step S88) and outputs the received brightness information (step S89). For example, the mobile terminal 14 displays the brightness information on its display.

Figure 9A:
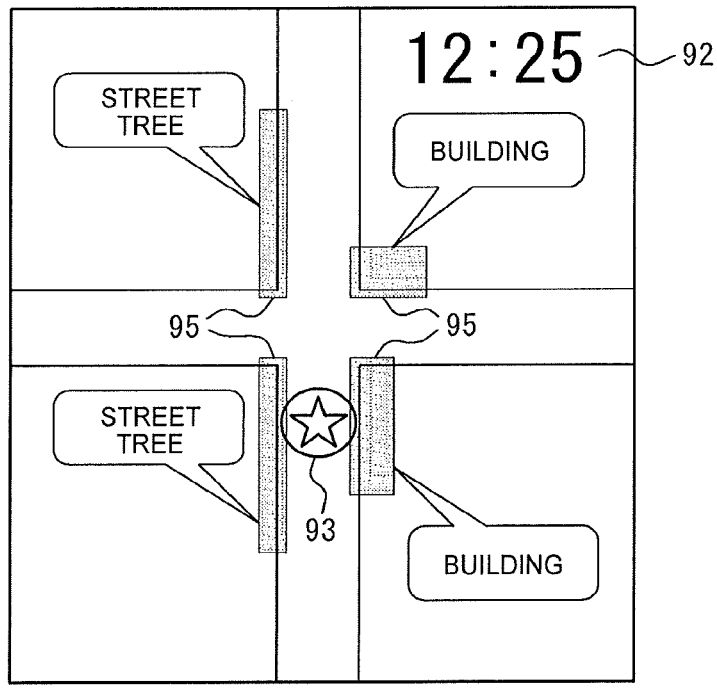
FIG. 9A is a diagram illustrating an output example of brightness information.
Figure 9B:
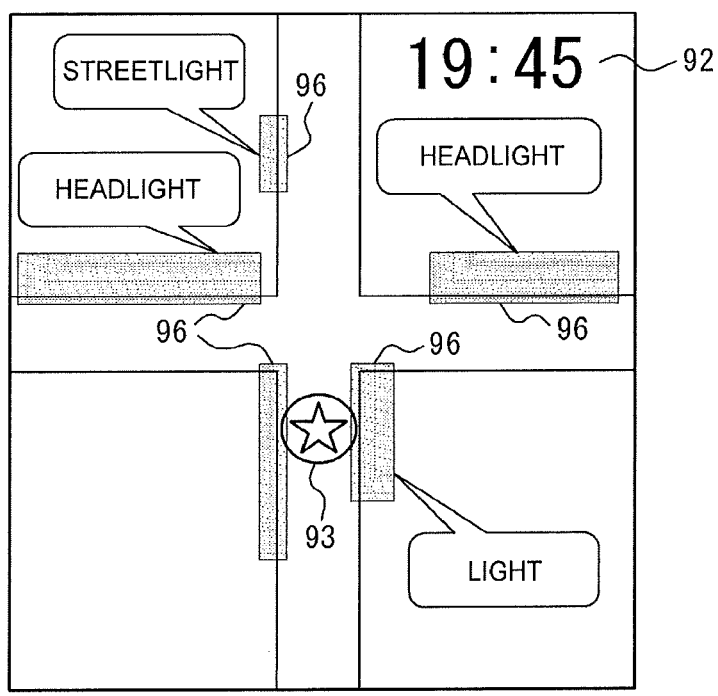
FIG. 9B is a diagram illustrating another output example of brightness information.

FIGS. 9A and 9B illustrate output examples of the mobile terminal 14. For example, as shown in FIG. 9A, the mobile terminal 14 displays a current time 92 on a daytime map 91 and also displays its current location 93 and shaded parts 95 on the daytime map 91 by using objects such as icons. The mobile terminal 14 may display the type of object that creates shade by using words such as "building" and "street tree." For example, as shown in FIG. 9B, the mobile terminal 14 displays a current time 92 on a nighttime map 94 and also displays its current location 93 and lit parts 96 on the nighttime map 94 by using objects such as icons. The mobile terminal 14 may display the type of light source by using words such as "headlight," "streetlight," and "light."

The mobile terminal 14 may produce voice output of the position of the shaded part and/or the position of the lit part. For example, the mobile terminal 14 may output a voice message that tells the user the position of the shaded part and/or lit part in relation to the current location, such as "there is shade 500 meters north" or "there is a lit sidewalk on your left when you walk 100 meters west and turn right." The mobile terminal 14 may output a voice message that tells the user the position of the shaded part and/or lit part by using the name of a nearby place, such as "there is shade on the left side of A Street" or "there is a lit sidewalk on your right when you turn left at B Intersection." The mobile terminal 14 may obtain the captured image corresponding to the brightness information 60 from the server 10 and may display a pop up of the captured image when the user taps an icon displayed at the position of the shaded part and/or lit part, for example. The user can thus recognize the shaded part and/or lit part on the image. Accordingly, user convenience is further improved.

As described above, with the information providing system 1 of the present embodiment, the user can walk comfortably or safely by selecting as appropriate the position of a part that is shaded in the daytime or the position of a part that is lit in the nighttime. User convenience is thus improved. Since all the brightness information is collected in the server 10 based on images captured by a plurality of vehicles 12, brightness information can be extensively and more quickly provided to the user.

In the above description, the server 10 provides the position of a shaded part and/or the position of a lit part corresponding to the current location of the mobile terminal 14. However, for example, the user may enter a desired location instead of the current location into the mobile terminal 14, and the server 10 may extract brightness information containing the position of a shaded part and/or the position of a lit part corresponding to the entered location and send the extracted brightness information to the mobile terminal 14. The user can thus obtain the brightness information in accordance with the time of day and the location where he or she plans to do something, for example.

Although the invention is described above based on the drawings and the embodiment, it should be noted that those skilled in the art would readily make various modifications and alterations based on the present disclosure. Accordingly, these modifications and alterations fall within the scope of the invention. For example, the functions etc. included in the units, the steps, etc. can be rearranged so as not to be logically inconsistent, and a plurality of units, steps, etc. may be combined into a single unit, step, etc. or each unit, step, etc. may be divided into sub-units, sub-steps, etc. A program that causes the control unit 36 of the on-board device 11 to perform the operation according to the present embodiment also falls within the scope of the invention.

Examples of the network 15 in the present embodiment include an ad hoc network, a local area network (LAN), a metropolitan area network (MAN), a cellular network, a wireless personal area network (WPAN), a public switched telephone network (PSTN), a terrestrial wireless network, an optical networks, other networks, and any combination thereof, in addition to the examples described above. Components of a wireless network include an access point (e.g., a Wi-Fi access point), a femtocell, etc. A wireless communication device can be connected to a wireless network using Wi-Fi (registered trademark), cellular communication technology, or other wireless technologies and technical standards, in addition to Bluetooth (registered trademark).

As described above, various aspects of the present disclosure can be implemented in many different forms, and all of the forms fall within the scope of the present embodiment.

What is claimed is:

1. A server, comprising:
   circuitry configured to:
   receive information on an image capture date and time and an image capture location from an on-board device that is configured to capture an image of surroundings of a vehicle and produce the captured image, the surroundings including a sidewalk;
   store brightness information of the sidewalk on the image capture date and time, the brightness information being detected based on the captured image and the image capture location; and
   send the brightness information to a mobile terminal, wherein
   the brightness information contains at least one of information on a position of a part of the sidewalk shaded in daytime and information on a position of a part of the sidewalk lit by a light source in nighttime, and
   the position of the part of the sidewalk shaded in the daytime is detected on a condition that an image of a person wearing a predetermined tool is detected from the captured image.

2. The server according to claim 1, wherein the circuitry is further configured to:
   receive the captured image from the on-board device; and
   detect the brightness information of the sidewalk on the image capture date and time based on the captured image and the image capture location.

3. The server according to claim 1, wherein the circuitry is configured to receive the brightness information of the sidewalk on the image capture date and time from the on-board device, the brightness information being detected by the on-board device based on the captured image and the image capture location.

4. The server according to claim 1, wherein the circuitry is configured to receive a current location of the mobile terminal and send to the mobile terminal brightness information containing information on a position of a shaded part or a lit part corresponding to the current location of the mobile terminal at a time of day corresponding to a current time.

5. The server according to claim 1, wherein the circuitry is configured to send brightness information of a position designated by the mobile terminal to the mobile terminal.

6. An on-board device, comprising:
   an imaging unit configured to capture an image of surroundings of a vehicle and produce the captured image, the surroundings including a sidewalk;
   one or more processors configured to:
   obtain an image capture date and time and an image capture location when the imaging unit captures the image, and
   detect brightness information of the sidewalk on the image capture date and time based on the captured image and the image capture location; and
   a transmitter configured to send the brightness information to a server, wherein
   the brightness information contains at least one of information on a position of a part of the sidewalk shaded in daytime and information on a position of a part of the sidewalk lit by a light source in nighttime, and
   the one or more processors are configured to detect the position of the part of the sidewalk shaded in the daytime on a condition that the one or more processors detect an image of a person wearing a predetermined tool from the captured image.

7. A vehicle comprising the on-board device according to claim 6.

8. A non-transitory storage medium storing a program, the program being executable by a mobile terminal and configured to cause the mobile terminal to perform a process, the process including:
   (a) receiving brightness information of a road on an image capture date and time from a server storing the brightness information, the brightness information being detected based on a captured image and an image capture location, and the captured image being an image of surroundings of a vehicle, which is captured and produced by an on-board device, the surroundings including a sidewalk; and
   (b) outputting the brightness information, wherein
   the brightness information contains at least one of information on a position of a part of the sidewalk shaded in daytime and information on a position of a part of the sidewalk lit by a light source in nighttime, and
   the position of the part of the sidewalk shaded in the daytime is detected on a condition that an image of a person wearing a predetermined tool is detected from the captured image.

9. A method for providing information by an on-board device and a server, the method comprising:
   (a) capturing an image of surroundings of a vehicle and producing the captured image by the on-board device, the surroundings including a sidewalk;
   (b) detecting brightness information of the sidewalk on an image capture date and time based on the captured image and an image capture location by at least one of the on-board device and the server; and
   (c) sending the brightness information from the server to a mobile terminal, wherein
   the brightness information contains at least one of information on a position of a part of the sidewalk shaded in daytime and information on a position of a part of the sidewalk lit by a light source in nighttime, and
   the step (b) includes detecting the position of the part of the sidewalk shaded in the daytime on a condition that an image of a person wearing a predetermined tool is detected from the captured image.

10. The method for providing information according to claim 9, further comprising:
    (d) storing the brightness information of the sidewalk on the image capture date and time in the server.

11. The method for providing information according to claim 9, further comprising:
    (e) sending the captured image from the on-board device to the server, wherein
    the step (b) includes detecting the brightness information of the sidewalk on the image capture date and time based on the captured image and the image capture location by the server.

12. The method for providing information according to claim 9, wherein the step (b) includes detecting the brightness information by the on-board device based on the captured image and the image capture location.

13. The method for providing information according to claim 9, further comprising:
    (f) receiving a current location of the mobile terminal by the server and sending to the mobile terminal brightness information containing at least one of information on a position of a shaded part and a lit part corresponding to the current location of the mobile terminal at a time of day corresponding to a current time.

* * * * *